(12) United States Patent
Yoo et al.

(10) Patent No.: US 6,856,367 B2
(45) Date of Patent: Feb. 15, 2005

(54) LIQUID CRYSTAL DISPLAY DEVICE AND METHOD OF FABRICATING THE SAME

(75) Inventors: Jang Jin Yoo, Seoul (KR); Do Hee Kwon, Seoul (KR); Hyun Ho Shin, Kyonggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/955,979

(22) Filed: Sep. 20, 2001

(65) Prior Publication Data

US 2002/0033914 A1 Mar. 21, 2002

(30) Foreign Application Priority Data

Sep. 20, 2000 (KR) ..................................... P2000-55233

(51) Int. Cl.$^7$ ........................................... G02F 1/1337
(52) U.S. Cl. ....................................................... 349/129
(58) Field of Search ................................ 349/128, 129, 349/110

(56) References Cited

U.S. PATENT DOCUMENTS

| | | | |
|---|---|---|---|
| 5,309,264 A | 5/1994 | Lien et al. ..................... 359/87 |
| 5,608,556 A | 3/1997 | Koma ........................ 349/143 |
| 5,666,179 A | 9/1997 | Koma ........................ 349/143 |
| 6,067,140 A * | 5/2000 | Woo et al. .................. 349/129 |
| 6,100,953 A * | 8/2000 | Kim et al. .................. 349/129 |
| 6,115,098 A * | 9/2000 | Kume et al. ................. 349/156 |
| 6,396,559 B1 * | 5/2002 | Kishimoto et al. ......... 349/156 |
| 6,583,835 B1 * | 6/2003 | Yoshida et al. ............. 349/124 |
| 6,750,934 B2 * | 6/2004 | Sakamoto et al. .......... 349/129 |
| 6,788,374 B2 * | 9/2004 | Ko et al. .................... 349/129 |

FOREIGN PATENT DOCUMENTS

| JP | 8-220511 | 8/1996 |
|---|---|---|
| JP | 8-220524 | 8/1996 |

OTHER PUBLICATIONS

K. H. Kim et al., "Domain Divided Vertical Alignment Mode With Optimized Fringe Field Effect", Asia Display 98, pp. 383–386.

V. A. Konovalov et al., "Multi–Domain Vertically Aligned Mode", SID 98 Digest, pp. 1127–1130.

B. G. Rho et al., "A New Wide–Viewing–Angle VA–Mode LCD With a Simpler Cell Fabrication Process", IDW '99, pp. 195–198.

* cited by examiner

Primary Examiner—Tarifur R. Chowdhury
Assistant Examiner—P. R. Akkapeddi
(74) Attorney, Agent, or Firm—Morgan, Lewis & Bockius LLP

(57) ABSTRACT

An LCD device is disclosed, which improves color characteristics and gray inversion regardless of a viewing angle. The LCD device includes a first electrode on a first substrate having a plurality of slit patterns, a second electrode on a second substrate, a liquid crystal layer between the first and second substrates, the liquid crystal layer having different alignment directions by each slit pattern, and at least one light-shielding layer below the first electrode.

13 Claims, 9 Drawing Sheets

LIQUID CRYSTAL DISPLAY DEVICE AND METHOD OF FABRICATING THE SAME

This application claims the benefit of Korean Application No. P2000-55233 filed on Sep. 20, 2000, which is hereby incorporated by reference.

BACKGROUND OF THE INVENTION

1. Field of the Invention

The present invention relates to a liquid crystal display (LCD) device, and more particularly, to a multi-domain LCD device that improves color characteristics and gray inversion regardless of a viewing angle.

2. Discussion of the Related Art

In general, an LCD device includes lower and upper substrates. In the lower substrate, a plurality of pixel regions are arranged in a matrix shape, and each pixel region has a thin film transistor (TFT) and a pixel electrode. In the upper substrate, a common electrode and a color filter layer for representing colors are formed thereon. A liquid crystal is injected between the lower and upper substrates. A polarizer is respectively formed at both sides of the lower and upper substrates to linearly polarize visible rays.

Such LCD device is widely used in monitors for computers, audiocassette recorders, and videocassette recorders. The LCD device contains liquid crystal therein, so that a main viewing angle is determined by a rubbing direction. An amount of light that passes through the LCD device is controlled by using birefringence and linear polarization of the liquid crystal, thereby displaying images.

In order to yield the LCD device having uniform luminance and high contrast ratio, the liquid crystal is aligned between the substrates in one direction.

There are various kinds of alignments in the liquid crystal, such as a homogeneous alignment, a homeotropic alignment, a tilted alignment, a twisted alignment, a hybrid alignment, a grandjean alignment, and a focal-conic alignment.

For the purpose of simplicity, only the twisted alignment LCD device will be described herein. In the twisted alignment LCD device, liquid crystal molecules are arranged in parallel to the lower and upper substrates. However, an alignment direction is different by an angle of 90 degrees between the lower and upper substrates, so that the molecules are successively aligned at the angle of 90 degrees between the two substrates.

Operation of such LCD device is based on an electro-optical method, in which a voltage is applied to a liquid crystal cell to vary the alignment of the liquid crystal, thereby varying electro-optical characteristics of the liquid crystal cell in representing images.

A viewing angle is an angle of eyes of a viewer with respect to the surface of the LCD device. Since a path of light passing through the liquid crystal layer varies with the angle of eyes of a viewer, birefringence of the liquid crystal is generated, thereby varying transmittance.

A viewing angle characteristic is a degree of the transmittance (contrast ratio) of the LCD device varying with the viewing angle.

Meanwhile, a related art lateral field induced vertical aligned (LFIVA) mode is a main stream technology in TFT-LCD devices. The LFIVA mode can achieve a wide viewing angle of 140 degrees or greater in any directions.

In such a mode, an alignment film on a common electrode is rubbed, and a pixel structure is formed in such a manner that a transparent electrode is etched in a portion of a pixel electrode at a width of 10 $\mu$m to 15 $\mu$m to form a slit pattern. Thus, electric fields are generated vertically and laterally. To the end, a wide viewing angle is obtained, so that a transmittance of 80%, a response time of 20 msec, and a viewing angle of 140 degrees or greater are achieved in the LFIVA mode.

In the LFIVA mode, the pixel electrode is formed of a metal film unlike the other mode using a transparent conductive film for the pixel electrode. Thus, one process step for forming a TFT-LCD can be reduced in the LFIVA mode. Especially, a scanning line can be formed of a material the same as that of the pixel electrode. Therefore, a large sized LCD TV is expected to simplify structures and reduce residual images.

A related art LCD device will be described with reference to the accompanying drawings.

FIG. 1 is a cross-sectional view showing a structure of the related art LFIVA mode LCD device.

As shown in FIG. 1, in the related art LCD device, a first transparent electrode 12 (pixel electrode) is formed to have slit patterns 11 at a constant distance on a first substrate (not shown). On a second substrate (not shown) opposing the first substrate, a second transparent electrode 13 is formed. Liquid crystals 14 are injected between the first and second substrates.

In the LFIVA mode LCD device, the liquid crystals 14 are arranged to oppose each other with respect to the slit patterns 11.

FIG. 2 is a graph showing a relationship between a gray level and a viewing angle in the related art LFIVA mode LCD device. As shown in FIG. 2, in the related art LFIVA mode LCD device, a transmittance curve of the middle gray level is significantly changed with an increase in the viewing angle.

As described above, the related art LFIVA mode LCD device has the following problems.

The liquid crystal layer in the middle portions of the slit patterns and the electrode is rotated along the rubbing direction, so that a multi-domain is formed. At this time, in the middle portions of the slit pattern and the electrode, optical distortions are generated, so that the viewing angle is inclined. For this reason, color characteristic and gray inversion are deteriorated.

SUMMARY OF THE INVENTION

Accordingly, the present invention is directed to a liquid crystal display (LCD) device and a method of fabricating the same that substantially obviates one or more of problems due to limitations and disadvantages of the related art.

Another object of the present invention is to provide an LCD device that improves color characteristic and gray inversion.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an LCD device includes a first electrode on a first substrate having a plurality of slit patterns, a second electrode on a second substrate, a liquid crystal layer between the first and second substrates, the liquid crystal layer having different alignment directions by each slit pattern, and at least one light-shielding layer below the first electrode.

In another aspect of the present invention, a method of fabricating a liquid display device on first and second substrates includes forming at least one light-shielding layer on the first substrate, forming a first electrode having a plurality of slit patterns over the light-shielding layer including the first substrate, forming a second electrode on the second substrate, assembling the first and second substrates, and forming a liquid crystal layer having different alignment directions by each slit pattern between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
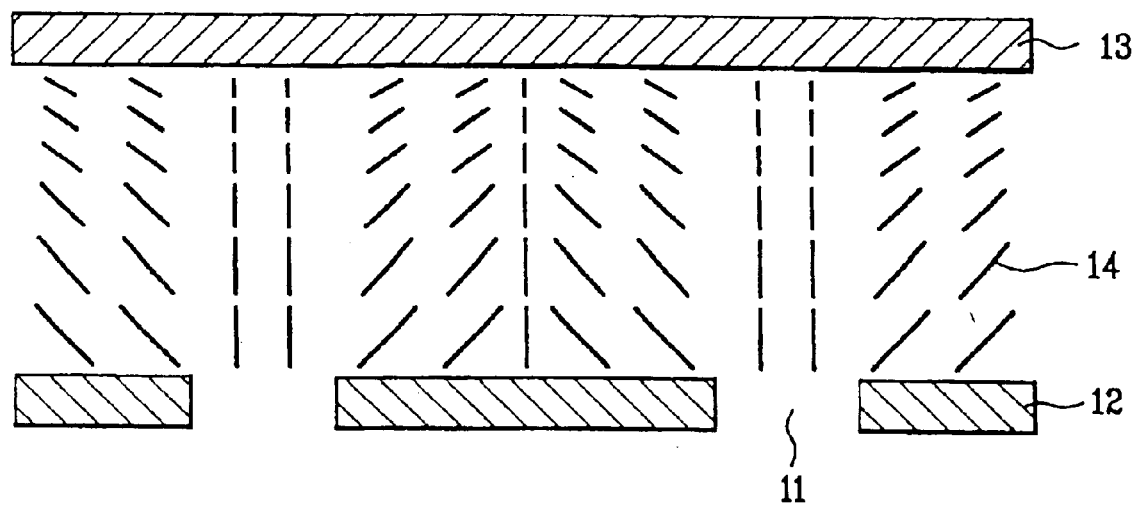
FIG. 1 is a cross-sectional view showing a structure of a related art LFIVA mode LCD device.
Figure 2:
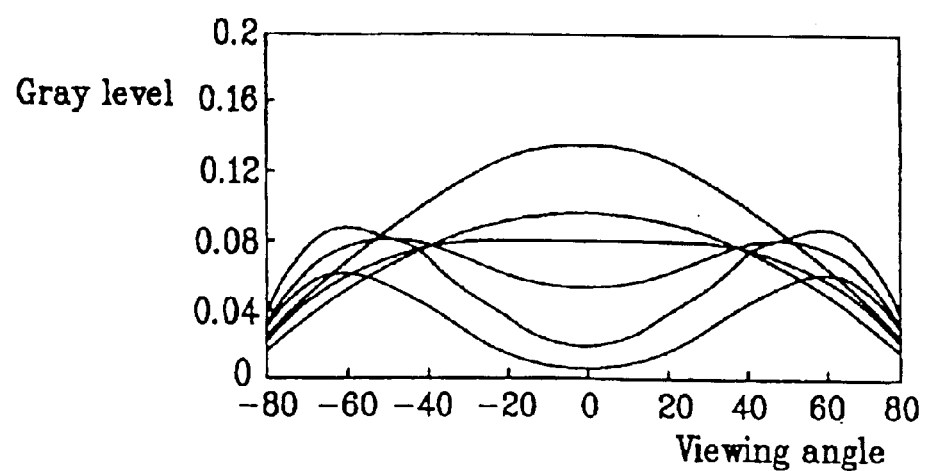
FIG. 2 a graph showing a relationship between a viewing angle and a gray inversion in the related art LFIVA mode LCD device.
Figure 3:
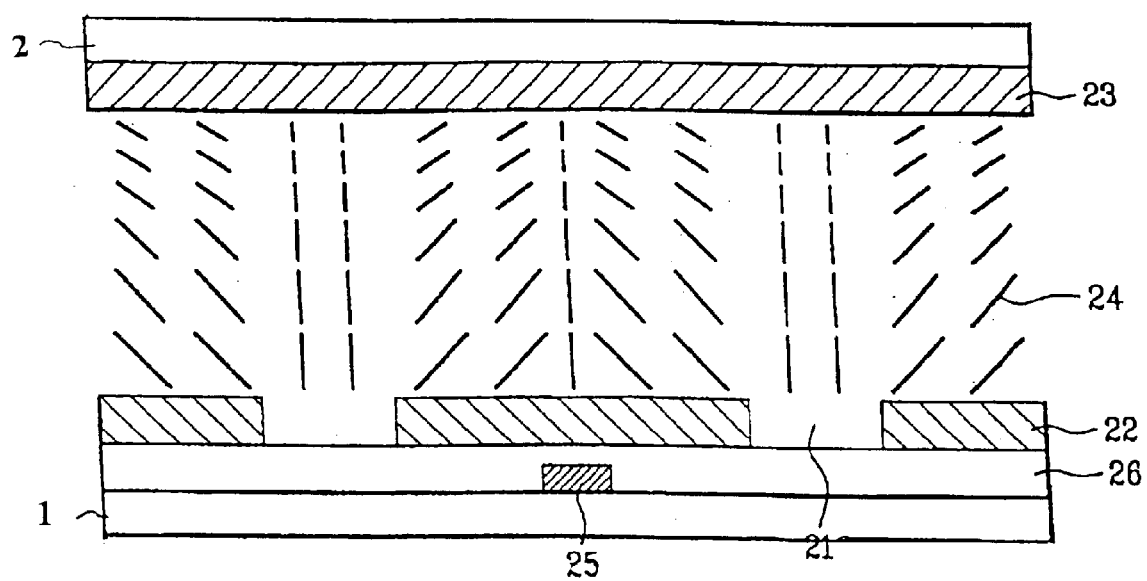
FIG. 3 is a cross-sectional view showing a structure of the LCD device according to a first embodiment of the present invention.

FIG. 3 is a cross-sectional view showing a structure of an LCD device according to a first embodiment of the present invention.

As shown in FIG. 3, the LCD device of the present invention includes first 1 and second 2 transparent substrates opposing each other and a first transparent electrode 22 having a plurality of slit patterns 21 at a constant distance on the first substrate. The slit patterns 21 in the present invention are shown as a discontinuity in the pixel electrode (or the first transparent electrode 22). A second transparent electrode 23 is formed on the second 2 transparent substrate opposing the first transparent electrode 22. Liquid crystals 24 are aligned to oppose each other by the slit patterns 21 between the first and second transparent electrodes 22 and 23. A black matrix (light-shielding layer) 25 is located below the first transparent electrode 22 at the center of the first substrate.

In fabricating processes, the black matrix 25 is formed on the first transparent substrate at a constant width, in the range of about 0 $\mu$m to 8 $\mu$m, for example. Then, an insulating film 26 is formed on the entire surface of the first transparent substrate including the black matrix 25. Subsequently, the first transparent electrode 22 having the slit patterns 21 is formed on the insulating film 26.

FIGS. 4A to 4E are graphs showing a transmittance of each gray level according to a black matrix width in the LCD device of the present invention.

As shown in FIGS. 4A to 4E, an electro-optical characteristic is improved with an increase in the width of the black matrix.

Figure 4A:
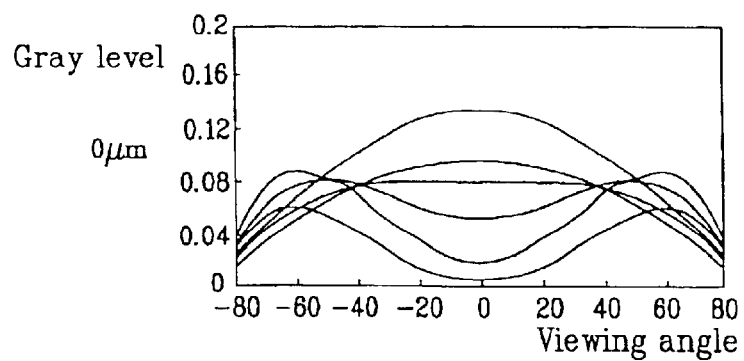
FIGS. 4A to 4E are graphs showing a transmittance of each gray level according to a black matrix width in the LCD device of the present invention.
Figure 4B:
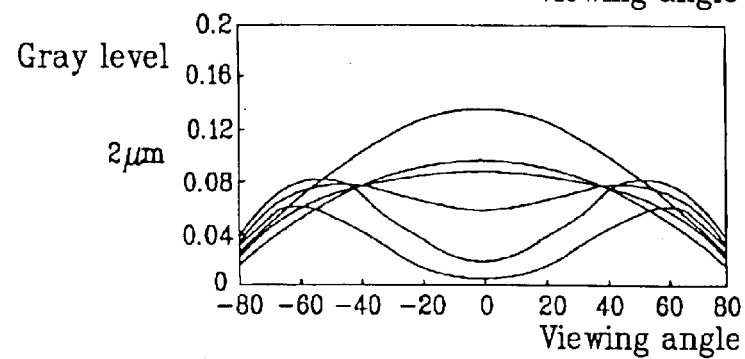
Figure 4C:
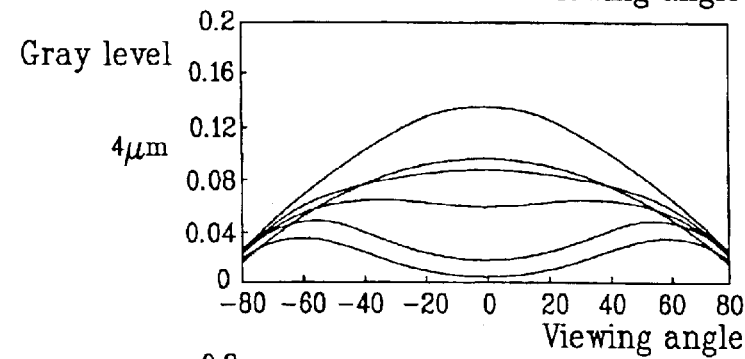
Figure 4D:
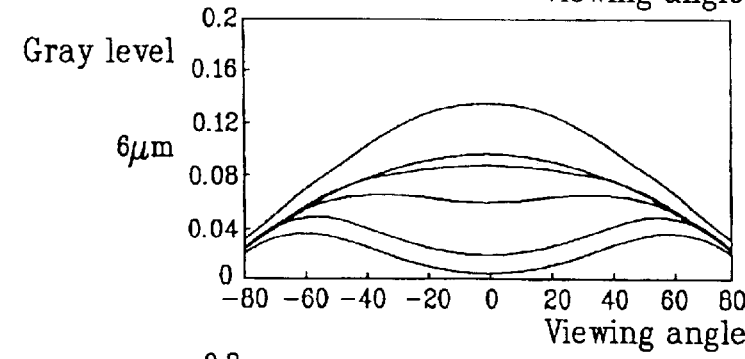
Figure 4E:
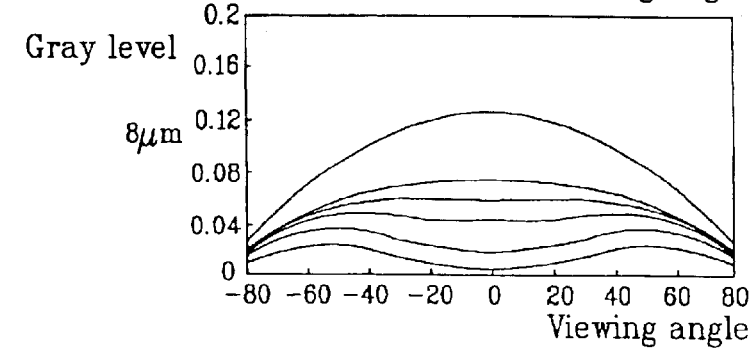

FIGS. 4A to 4E show the transmittance of each gray level when the width of the black matrix is respectively about 0 $\mu$m, 2 $\mu$m, 4 $\mu$m, 6 $\mu$m, and 8 $\mu$m. As shown in FIG. 4E, the black matrix having a width of about 8 $\mu$m has the best electro-optical characteristic among them.

Figure 5:
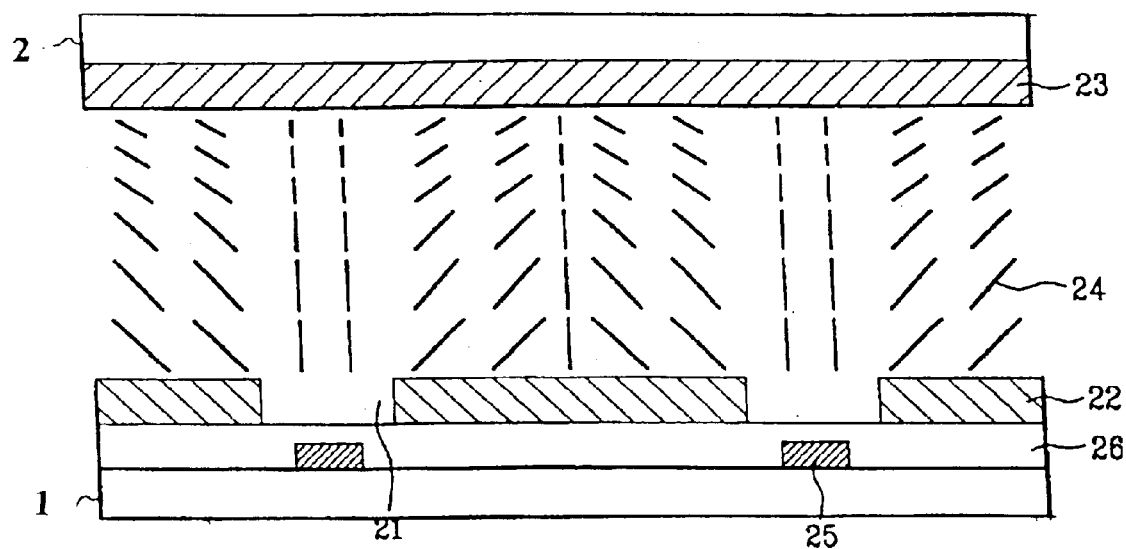
FIG. 5 is a cross-sectional view showing a structure of the LCD device according to a second embodiment of the present invention.

FIG. 5 is a cross-sectional view showing a structure of the LCD device according to a second embodiment of the present invention.

As shown in FIG. 5, the LCD device according to the second embodiment of the present invention includes first 1 and second 2 substrates opposing each other and a first transparent electrode 22 having slit patterns at a constant distance on the first substrate. A second transparent electrode 23 is formed on the second 2 substrate opposing the first transparent electrode 22. Liquid crystals 24 are aligned to oppose each other by the slit patterns 21 between the first and second transparent electrodes 22 and 23. A black matrix 25 is formed below the slit patterns 21.

In fabricating processes, the black matrix 25 is formed on the first substrate at a constant width. An insulating film 26 is then formed on the entire surface of the first substrate including the black matrix. Thereafter, the first transparent electrode 22 having the slit patterns 21 is formed on the insulating film 26.

Figure 6:
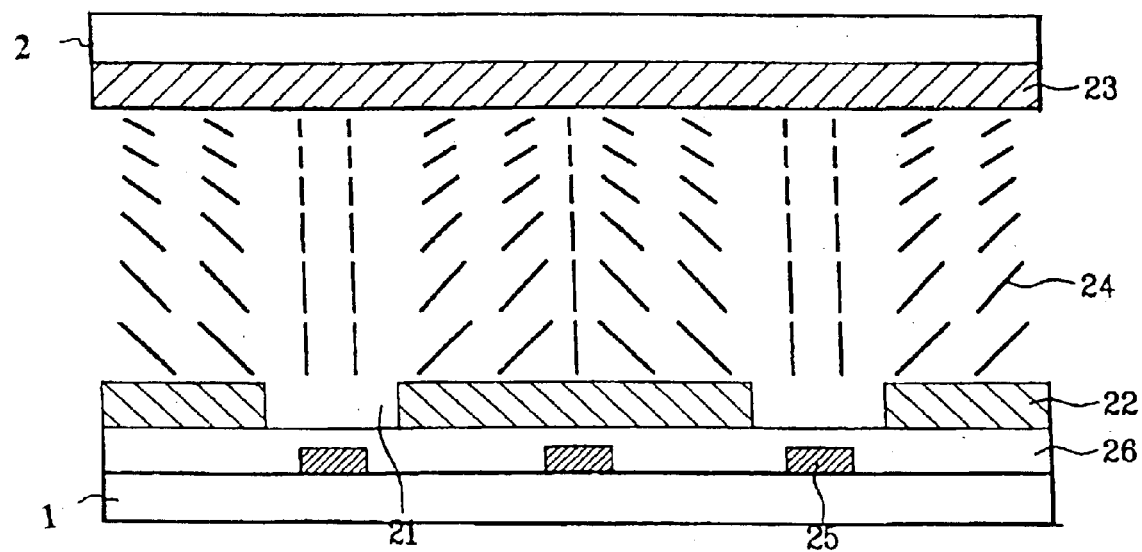
FIG. 6 is a cross-sectional view showing a structure of the LCD device according to a third embodiment of the present invention.
Figure 7A:
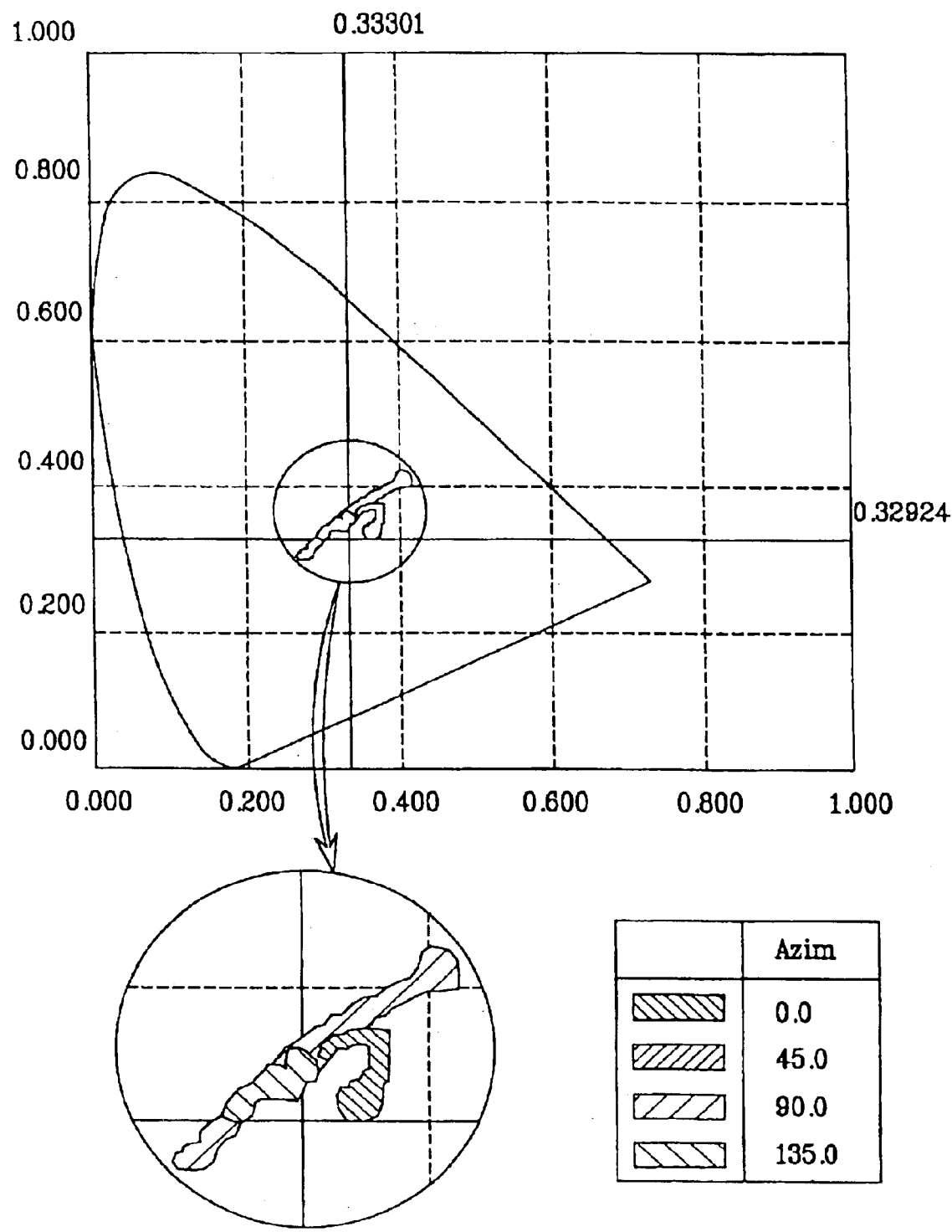
FIGS. 7A to 7E are chromaticity coordinates showing color characteristics according to the black matrix width of the present invention.
Figure 7B:
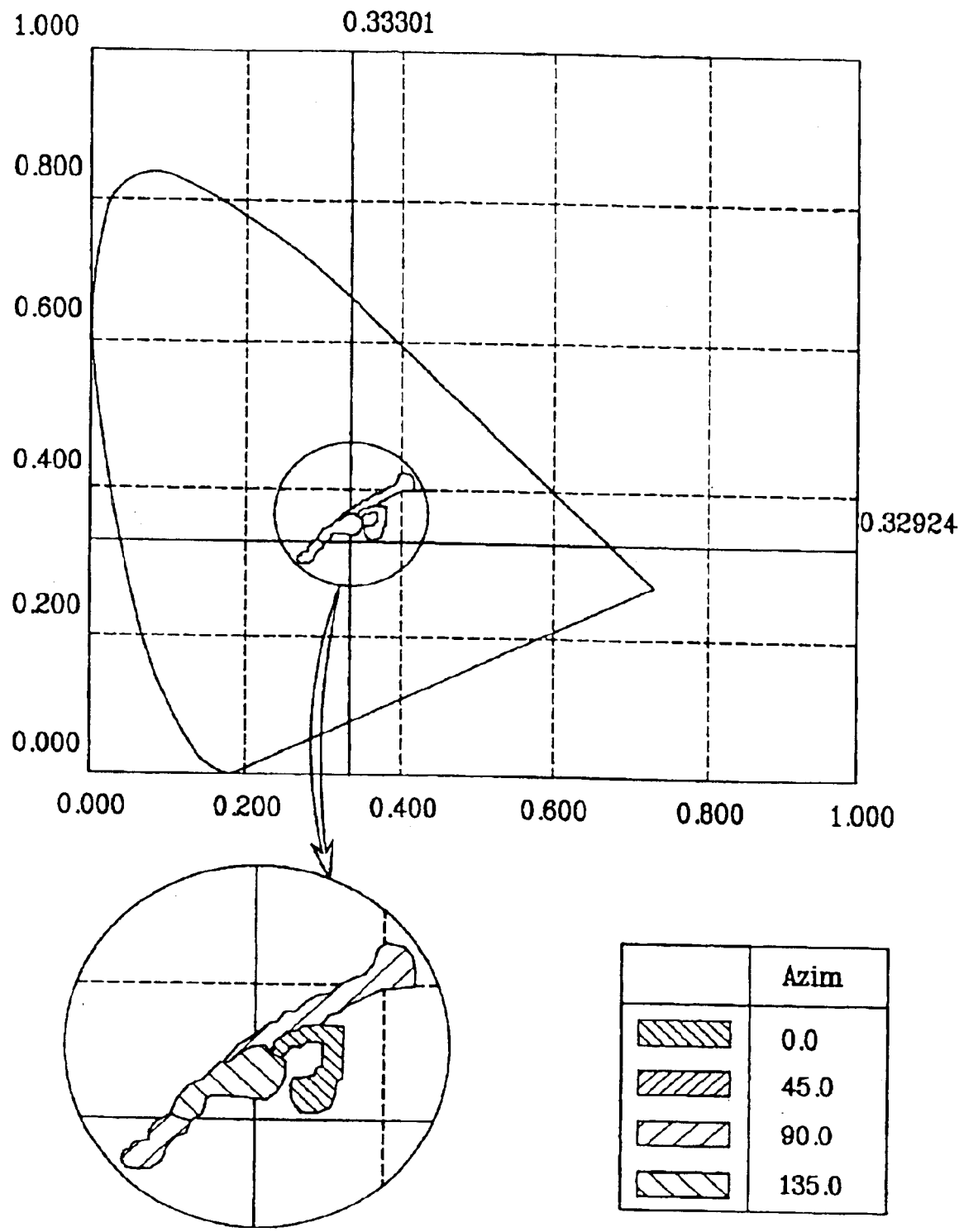
Figure 7C:
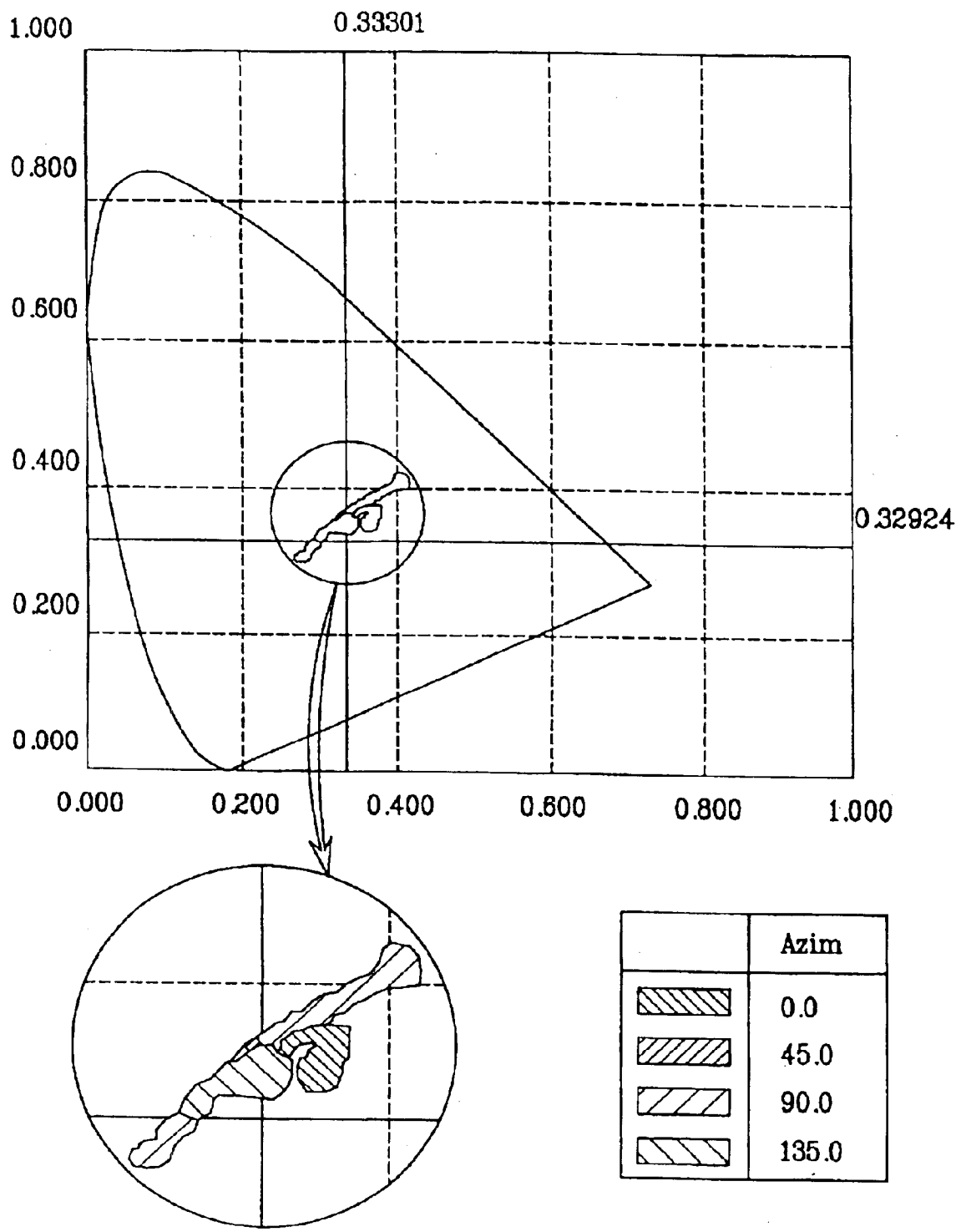
Figure 7D:
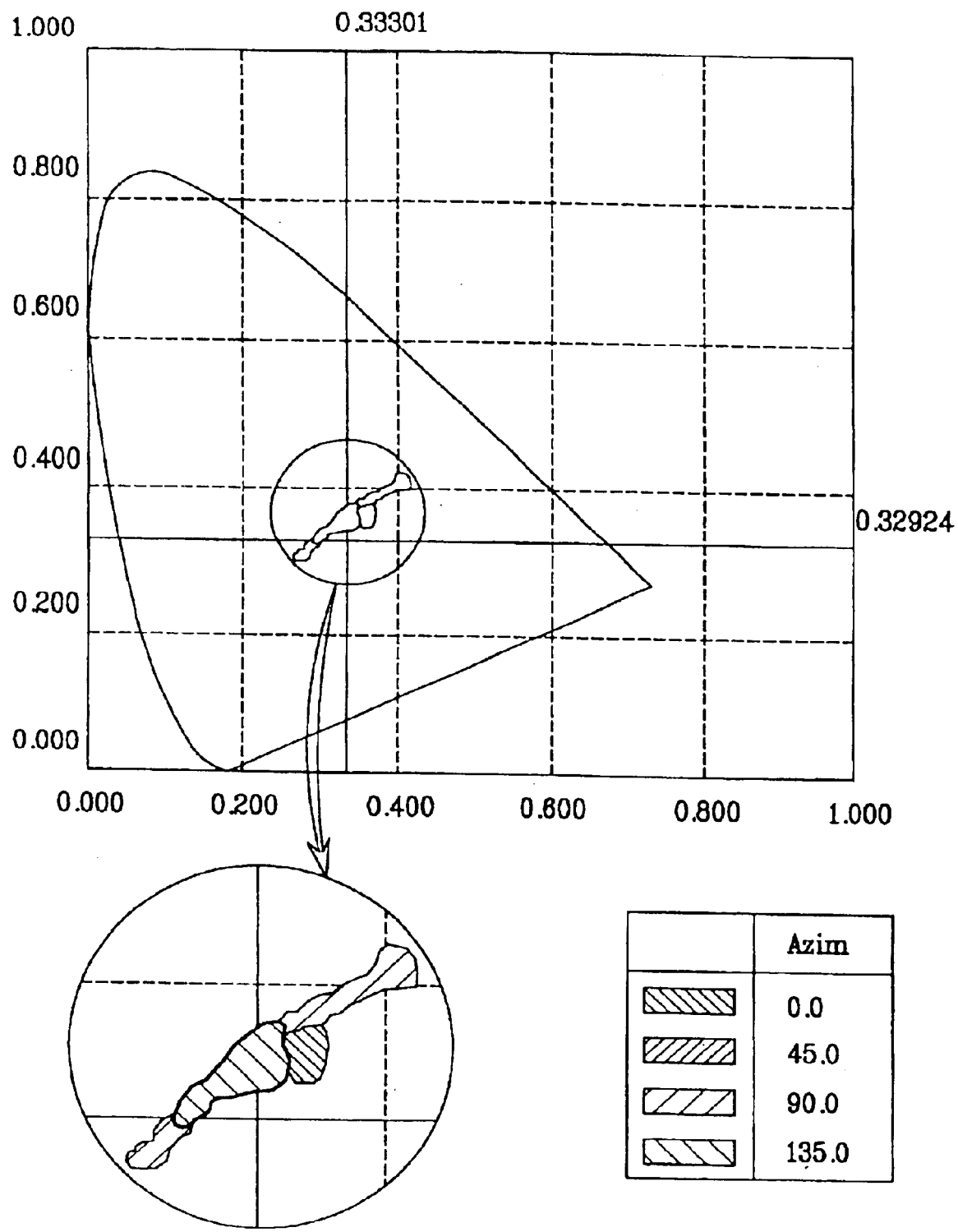
Figure 7E:
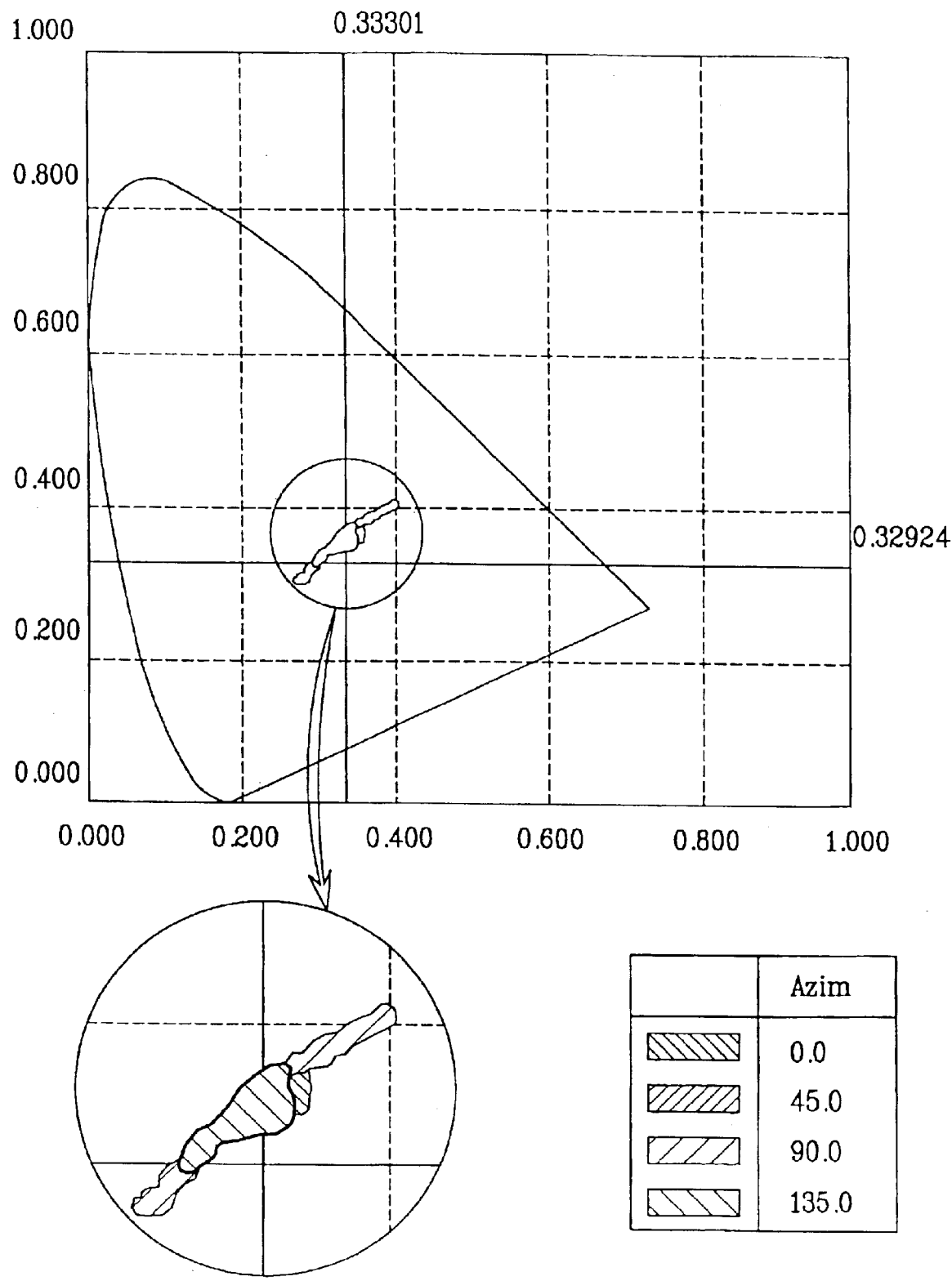

FIG. 6 is a cross-sectional view showing a structure of the LCD device according to a third embodiment of the present invention.

As shown in FIG. 6, the LCD device according to the third embodiment of the present invention includes first 1 and second 2 substrates and a first transparent electrode 22 having slit patterns 21 at a constant distance on the first substrate. A second transparent electrode 23 is formed on the second substrate 2 opposing the first transparent electrode 22. Liquid crystals 24 are aligned to oppose each other by the slit patterns 21 between the first and second transparent electrodes 22 and 23. A black matrix 25 is formed below the first transparent electrode 22 and below the slit patterns 21 to shield lights.

At this time, the black matrix 25 is formed on the first substrate at a constant width. An insulating film 26 is formed on the entire surface of the first substrate including the black matrix 25.

Referring to FIGS. 7A to 7E, detailed descriptions as to variations of color characteristics will be discussed in accordance with the black matrix.

FIGS. 7A to 7E are chromaticity coordinates showing color characteristics according to widths of the black matrix. As shown in FIGS. 7A to 7E, as the width of the black matrix increases (from 0 μm to 8 μm), the color characteristic is substantially improved at 0 degree (at left and right sides).

As aforementioned, the LCD device of the present invention has the following advantages.

A black matrix may be formed below the first transparent electrode having slit patterns. Alternatively, it can be located below the slit patterns or below both the first transparent electrode and the slit patterns. Thus, the dependency of the viewing angle in chromaticity coordinates is reduced. Furthermore, the inversion between gray levels can be reduced at right and left sides. Therefore, the gray inversion characteristic is improved.

It will be apparent to those skilled in the art that various modifications and variations can be made in the liquid crystal display (LCD) device and the method of fabricating the same of the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   an insulating filni on a first substrate;
   a first electrode having a plurality of slit patterns directly contacting the insulating film;
   at least one light-shielding layer on the first substrate and below each slit pattern;
   a second electrode on a second substrate; and
   a liquid, crystal layer between the first and second substrates, the liquid crystal layer having different alignment directions by each slit pattern,
   wherein the light-shielding layer includes a black matrix, and
   wherein both the first electrodes and the light-shielding layer are within a same unit pixel region.

2. The device as claimed in claim 1, wherein the light-shielding layer is located below a middle portion of the first electrode.

3. A liquid crystal display device comprising:
   an insulating film on a first substrate;
   a first electrode having a plurality of slit patterns directly contacting the insulating film;
   at least one light-shielding layer on the first substrate below the first electrode and the slit patterns;
   a second electrode on a second substrate; and
   a liquid crystal layer between the first and second substrates, the liquid crystal layer having different alignment directions by each slit pattern,
   wherein the light-shielding layer includes a black matrix, and
   wherein both the first electrode and the light-shielding layer are within a same unit pixel region.

4. The device as claimed in claim 1, wherein the first electrode includes a transparent conductive material.

5. The device as claimed in claim 1, wherein the second electrode includes a transparent conductive material.

6. The device as claimed in claim 1, further comprising an insulating film on an entire surface of the first substrate.

7. A method of fabricating a liquid crystal display device on first and second substrates, comprising:
   forming at least one light-shielding layer on the first substrate;
   forming an insulating layer on the entire surface of the first substrate and on the at least one light-shielding layer;
   forming a first electrode directly on the insulating layer, the first electrode having a plurality of slit patterns over the light-shielding layer;
   forming a second electrode on the second substrate;
   assembling the first and second substrates; and
   forming a liquid crystal layer having different alignment directions by each slit pattern between the first and second substrates,
   wherein the light-shielding layer includes a black matrix,
   wherein both the first electrode and the light-shielding layer are within a same unit pixel region.

8. The method as claimed in claim 7, wherein the light-shielding layer is formed below a middle portion of the first electrode.

9. The method as claimed in claim 7, wherein the light-shielding layer is formed below each slit pattern.

10. The method as claimed in claim 7, wherein the light-shielding layer is formed below middle portions of both the first electrode and the slit patterns.

11. The method as claimed in claim 7, wherein the first electrode includes a transparent conductive material.

12. The method as claimed in claim 7, wherein the second electrode includes a transparent conductive material.

13. The method as claimed claim 7, further comprising forming an insulating film on an entire surface of the first substrate and the light-shielding layer.

* * * * *